United States Patent Office 3,341,317
Patented Sept. 12, 1967

3,341,317
PYRIDAZONE DERIVATIVES AND THEIR USE AS HERBICIDES
Franz Reicheneder and Franz Winter, Ludwigshafen (Rhine), and Adolf Fischer, Mutterstadt, Pfalz, Germany, and Karl Dury, deceased, late of Kirchheimbolanden, Pfalz, Germany, by said Franz Winter, representative of the heirs, assignors to Badische Anilin- & Soda - Fabrik Aktiengesellschaft, Ludwigshafen (Rhine), Germany
No Drawing. Filed Aug. 3, 1966, Ser. No. 570,091
Claims priority, application Germany, Aug. 17, 1965, B 83,287; Aug. 25, 1965, B 83,429
5 Claims. (Cl. 71—92)

The present invention relates to new pyridazone derivatives. It relates particularly to pyridazone derivatives derived from carbamic acid and having a good herbicidal action.

It is an object of this invention to provide new and valuable pyridazone derivatives. Another object of the invention is to provide a process for controlling unwanted vegetation, particularly in crop plants without damage to the crop plants.

It is known that 1 - phenyl - 4 - amino - 5-chloropyridazone-6 (referred to hereinafter as (A) and 2-chloro-4,6-bis-ethylamino)-s-triazine (referred to hereinafter as (B) may be used as herbicidal active ingredients. Their effect is however unsatisfactory.

We have found that herbicidal compositions which contain a pyridazone derivative having the formula:

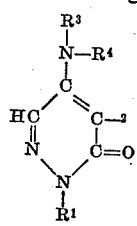

in which $R^1$ denotes a phenyl radical which may bear halogen atoms or lower alkyl groups as substituents, or a cyclohexyl radical, cyclooctyl radical or cyclohexenyl radical, $R^2$ denotes a halogen atom, a methoxyl radical or a thiomethyl radical, $R^3$ and $R^4$ together denote the radical =C=O or =S=O or $R^3$ denotes a hydrogen atom or an alkyl radical having one to four carbon atoms and $R^4$ denotes the radical —COXR$^5$ in which X denotes =O or =S and $R^5$ denotes the radical

—R$^6$—O—CO—N—R$^3$

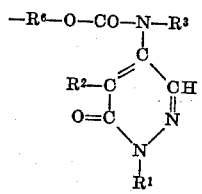

in which $R^6$ denotes an ethylene radical, a propylene radical or a butylene radical and $R^1$, $R^2$ and $R^3$ have the above meanings, or $R^5$ may also have the following meanings: an alkyl radical having having one to eighteen carbon atoms which may bear as substituents hydroxyl groups, methoxyl groups, ethoxyl groups, carboxyl groups, chlorine atoms, bromine atoms, thiocyano groups or dialkylamino groups having one to four carbon atoms in each alkyl radical, or an alkenyl radical having three or four carbon atoms which may bear chlorine atoms as substituents, or an alkinyl radical having three to six carbon atoms, or a phenyl radical which may bear as substituents chlorine atoms, bromine atoms, hydroxyl groups or alkyl groups, or a cyclohexyl radical, a cyclooctyl radical, the benzyl radical, acetonimino radical, dichlorocrotonolactone radical, tetrachlorotetrahydrofuran radical or the bicycloheptenylmethylene radical, have good herbicidal action.

The new active ingredients may be prepared by reaction of the appropriate 4-aminopyridazones with phosgene or thionyl chloride, reaction of 4 - isocyanatopyridazones or the corresponding carbamyl chlorides with the appropriate alcohols, glycols, phenols, thioalcohols or thiophenols.

The following methods of preparing the new active ingredients are given by way of example.

*Production of 1-phenyl-4-isocyanato-5-bromopyridazone-(6)*

50 parts (by weight of 1-phenyl-4-amino-5-bromopyridazone - (6) is suspended in 300 parts of chlorobenzene and heated to 130° C. while stirring. Phosgene is simultaneous introduced into the mixture. Four to five hours later a clear solution is obtained, the supply of phosgene is stopped and the reaction mixture is reduced to about ⅓ of its original volume under subatmospheric pressure by evaporating the chlorobenzene. After cooling 44 parts of 1-phenyl-4-isocyanato-5-bromopyridazone-(6) is crystallized as a pale yellow substance having a melting point of 146° to 149° C.

*Production of N-(1-phenyl-5-chloropyridazon-6)-yl-carbamoyl-β-hydroxyethyl ester*

25 parts (by weight) of 1-phenyl-4-isocyanato-5-chloropyridazone-(6) dissolved in 100 parts of benzene is mixed with 8 parts of glycol and the mixture boiled for 10 minutes under reflux. After the reaction solution has been reduced and cooled the crystallized N-(1-phenyl-5-chloropyridazon-6) - 4 - yl - carbamoyl-β-hydroxyethyl ester is suction filtered. 29 aparts of the ester recrystallized from acetic acid melt at 168° to 170° C.

*Production of 1-phenyl-4-sulfinylamino-5-chloropyridazone-(6)*

150 parts (by weight) of dimethyl formamide are dripped into a solution of 22 parts of 1-phenyl-4-amino-5-chloropyridazone-(6) in 200 parts of thionyl chloride while stirring. The temperature of the reaction is kept at 50° C. by cooling with ice. The reaction mixture is heated and stirred for another hour at 100° C. and then reduced in vacuo by evaporation to about half of its original volume. After cooling the resulting solid substance is suction filtered, washed with water and recrystallized from acetonitrile. 20 parts of 1-phenyl-4-sulfinylamino-5-chloropyridazone-(6) having a melting point of 240° to 241° C. is obtained.

The following active substances are given as examples:

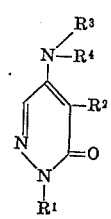

| R¹ | R² | R³ | R⁴ | R⁵ | X | M.P., °C |
|---|---|---|---|---|---|---|
|  | Cl | =S=O | =S=O | -------- | -------- | 240 to 241; |
|  | Cl | =C=O | =C=O | -------- | -------- | 153 to 154; |
| 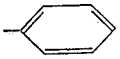 | Br | =C=O | =C=O | -------- | -------- | 144 to 146. |
| 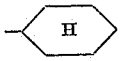 H | Cl | =C=O | =C=O | -------- | -------- | 121 to 123. |
|  | Cl | H | —COXR₅ | —CH₃ | O | 142 to 143. |
|  | Cl | H | —COXR₅ | —C₂H₅ | O | 110 to 111. |
| 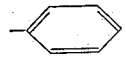 | Cl | H | —COXR₅ | —C₂H₂—CH₂OH | O | 168 to 170. |
|  | Cl | H | —COXR₅ | —CH₂.CH₂OH₂H₅ | O | 67 to 71; |
| 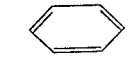 | Cl | H | —COXR₅ | —CH₂—C≡CH | O | 164 to 166. |
|  | Cl | H | —COXR₅ | —C₈H₁₇ | O | 53 to 54. |
| 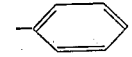 | Cl | H | —COXR₅ | —iC₉H₁₉ | O | 58 to 62. |
| 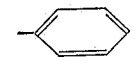 | Cl | H | —COXR₅ | —C₁₈H₃₇ | O | 66 to 69. |
| 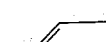 | Cl | H | —COXR₅ |  | O | 143 to 145. |
| 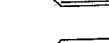 | Cl | H | —COXR₅ |  | O | 120 to 122. |
| 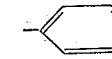 | Cl | H | —COXR₅ |  | O | 196 to 198. |
| 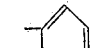 | Cl | H | —COXR₅ |  | O | 165 to 170. |
| 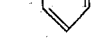 | Cl | H | —COXR₅ | 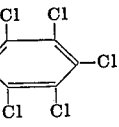 | O | 172 to 176. |
| 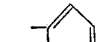 | Cl | H | —COXR₅ |  | O | 148 to 149. |
| 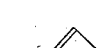 | Cl | H | —COXR₅ |  | O | 147 to 150. |
| 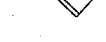 | Cl | H | —COXR₅ |  | O | 157 to 160.[1] |

| R¹ | R² | R³ | R⁴ | R⁵ | X | M.P., °C. |
|---|---|---|---|---|---|---|
| phenyl | Cl | H | —COXR₅ | —N=C(CH₃)(CH₃) | O | 148 to 149. |
| 4-methylphenyl | Br | H | —COXR₅ | —C₂H₅ | O | 106 to 107. |
| cyclohexyl | Cl | H | —COXR₅ | —CH₃ | O | 104 to 106. |
| 4-methylphenyl | Cl | H | —COXR₅ | phenyl | S | 143 to 145. |
| phenyl | Cl | H | —COXR₅ | 4-chlorophenyl | S | 159 to 160. |
| 4-methylphenyl | Cl | H | —COXR₅ | 4-bromophenyl | S | 165 to 168. |
| phenyl | Cl | H | —COXR₅ | —CH₂.C=CCl (Cl, Cl) | S | 86 to 89. |
| phenyl | Cl | H | —COXR₅ | —CH₂—CH₂—COOH | S | 165.¹ |
| phenyl | Cl | H | —COXR₅ | —CH₂—CH₂—N(C₂H₅)(C₂H₅)·HCl | S | 174 to 177. |
| phenyl | Cl | H | —COXR₅ | —CH₂—CH₂—O—C(=O)—NH—(4-chloro-6-oxo-1-phenyl-pyridazinyl) | S | 194 to 199. |

¹ Decomposition.

The herbicides according to this invention may be prepared by conventional methods by mixing the active ingredients with solid or liquid carriers, for example water, hydrocarbons, clay, fertilizers, borax or diatomaceous earth. It is also possible to add wetting agents, dispersing agents, adhesives or other biologically active ingredients.

The following examples illustrate the use of the herbicides according to this invention and their advantages over prior art herbicides.

EXAMPLE 1

Seeds of Indian corn (*Zea mays*), barley (*Hordeum vulgare*), wheat (*Triticum vulgare*), cotton (*Gossypium sp.*), peas (*Pisum sativum*), beet (*Beta vulgaris*), wild mustard (*Sinapis arvensis*), white goosefoot (*Chenopodium album*), chickweed (*Stellaria media*), gallant soldier (*Galinsoga parviflora*) and annual meadow grass (*Poa annua*) are sown in plastics pots having a diameter of 8 cm. in a greenhouse and on the same day treated with 1-phenyl - 4 - sulfinylamino - 5 - chloropyridazone - 6 (I), 1 - phenyl - 4 - isocyanato - 5 - bromopyridazone - 6 (II) and, for comparison, with A. The rate of application is 2 kg. per hectare of active ingredient dispersed in an amount of water equivalent to 500 liters per hectare. The results of the experiment may be seen in the following table:

|  | Active ingredient | | |
|---|---|---|---|
|  | I | II | A |
| Crop plants: | | | |
| Indian corn | 0 | 0 | 10. |
| Barley | 0 | 0 | 20. |
| Wheat | 0 | 0 | 20 to 30. |
| Cotton | 0 to 10 | 0 to 10 | Do. |
| Peas | 0 | 0 | 10 to 20. |
| Beet | 0 | 0 | 0. |
| Unwanted plants: | | | |
| Wild mustard | 90 to 100 | 80 to 90 | 80. |
| White goosefoot | 90 | 90 to 100 | 70 to 80. |
| Chickweed | 90 | do | 70. |
| Gallant soldier | 80 to 90 | 80 to 90 | 70 to 80. |
| Annual meadow grass | 70 | 70 to 80 | 60 to 70. |

0=no damage; 100=total destruction.

In the above Example 1 and in the following Examples 2, 3 and 4, the following compounds have the same biological action as compounds I and II:

1-phenyl-4-sulfinylamino-5-bromopyridazone-6
1-p-chlorophenyl-4-sulfinylamino-5-chloropyridazone-6
1-p-chlorophenyl-4-sulfinylamino-5-bromopyridazone-6
1-p-fluorophenyl-4-sulfinylamino-5-chloropyridazone-6
1-p-fluorophenyl-4-sulfinylamino-5-bromopyridazone-6
1-p-methylphenyl-4-sulfinylamino-5-chloropyridazone-6
1-p-methylphenyl-4-sulfinylamino-5-bromopyridazone-6
1-phenyl-4-isocyanato-5-chloropyridazone-6
1-p-chlorophenyl-4-isocyanato-5-chloropyridazone-6
1-p-chlorophenyl-4-isocyanato-5-bromopyridazone-6
1-p-fluorophenyl-4-isocyanato-5-chloropyridazone-6
1-p-fluorophenyl-4-isocyanato-5-bromopyridazone-6
1-p-methylphenyl-4-isocyanato-5-chloropyridazone-6
1-p-methylphenyl-4-isocyanato-5-bromopyridazone-6
1-cyclohexyl-4-sulfinylamino-5-bromopyridazone-6
1-p-methylcyclohexyl-4-sulfinylamino-5-chloropyridazone-6
1-p-methylcyclohexyl-4-sulfinylamino-5-bromopyridazone-6
1-cyclohexyl-4-isocyanato-5-chloropyridazone-6
1-p-methylcyclohexyl-4-isocyanato-5-chloropyridazone-6
1-o-methylcyclohexyl-4-isocyanato-5-bromopyridazone-6
1-cyclooctyl-4-sulfinylamino-5-bromopyridazone-6
1-cyclooctyl-4-isocyanato-5-chloropyridazone-6
1-m-methylcyclohexyl-4-isocyanato-5-bromopyridazone-6.

EXAMPLE 2

The plants Indian corn (*Zea mays*), barley (*Hordeum vulgare*), wheat (*Triticum vulgare*), beet (*Beta vulgaris*), sorrel (*Rumex sp.*), wild mustard (*Sinapis arvensis*), white goosefoot (*Chenopodium album*), chickweed (*Stellaria media*) and gallant soldier (*Galinsoga parviflora*) are treated at a growth height of 5 to 16 cm. with I, II and, for comparison, with A. The rate of application is 2 kg. per hectare of active ingredient, dispersed in an amount of water equivalent to 500 liters per hectare. The results of the experiment are given in the following table:

|  | Active ingredient | | |
|---|---|---|---|
|  | I | II | A |
| Crop plants: | | | |
| Indian corn | 0 | 0 | 10. |
| Barley | 0 to 10 | 0 to 10 | 20 to 30. |
| Wheat | do | do | Do. |
| Beet | 0 | 0 | 0. |
| Unwanted plants: | | | |
| Sorrel | 90 | 90 | 70. |
| Wild mustard | 90 to 100 | 90 to 100 | 80. |
| White goosefoot | 100 | do | 80. |
| Chickweed | 90 to 100 | 90 | 70 to 80. |
| Gallant soldier | do | 90 | 90. |

0=no damage; 100=total destruction.

EXAMPLE 3

An agricultural cultivated area is sown with wild mustard (*Sinapis arvensis*), white goosefoot (*Chenopodium album*), chickweed (*Stellaria media*), gallant soldier (*Galinsoga parviflora*), sorrel (*Rumex sp.*), annual meadow grass (*Poa annua*) and slender foxtail (*Alopecurus myosuroides*) and treated on the day of sowing with I, II and B. The rate of application is 5 kg. per hectare of active ingredient disprsed in an amount of water equivalent to 500 liters per hectare. After the plants have emerged it is evident that I and II have a stronger initial herbicidal effect. Four weeks later almost all the plants have completely withered.

EXAMPLE 4

Compounds I, II and B are sprayed onto an agricultural cultivated area which is overgrown with wild mustard (*Sinapis arvensis*), white goosefoot (*Chenopodium album*), chickweed (*Stellaria media*), gallant soldier (*Galinsoga parviflora*), sorrel (*Rumex sp.*), annual meadow grass (*Poa annua*) and slender foxtail (*Alopecurus myosuroides*) at a growth height of the plants of 3 to 9 cm. The rate of application is 5 kg. per hectare of active ingredient dispersed in an amount of water equivalent to 500 liters per hectare. A few days later it is evident that compounds I and II have a stronger initial herbicidal action than B. Three weeks later almost all the plants have withered.

EXAMPLE 5

Seeds of beet (*Beta vulgaris*), Indian corn (*Zea mays*), white goosefoot (*Chenopodium album*), amaranth pigweed (*Amaranthus retroflexus*), chickweed (*Stellaria media*), small nettle (*Urtica urens*), camomile (*Matricaria chamomilla*), wild mustard (*Sinapis arvensis*) and annual meadow grass (*Poa annua*) are sown in plastics pots in a greenhouse and are treated on the same day with N - (1 - phenyl - 5 - chloropridazon - 6) - 4 - yl - carbamoyl-$\beta$-hydroxyethyl ester (III) and, for comparison, with A. The rate of application is 2 kg. of active ingredient per hectare dispersed in an amount of water equivalent to 500 liters per hectare.

The results of the experiment four weeks after the treatment may be seen from the following table:

|  | Active ingredient | |
|---|---|---|
|  | III | A |
| Crop plants: | | |
| Beet | 0 | 0. |
| Indian corn | 0 | 0 to 10. |
| Unwanted plants: | | |
| White goosefoot | 100 | 80. |
| Amaranth pigweed | 100 | 80. |
| Chickweed | 100 | 80 to 90. |
| Small nettle | 100 | 90. |
| Camomile | 90 to 100 | 80 to 90. |
| Wild mustard | 100 | 80. |
| Annual meadow grass | 90 to 100 | 80. |

0=no damage; 100=total destruction.

The following compounds have the same biological action as compound III in the above Example 5 and in the following Examples 6, 7 and 8.

ethyl N-(1-phenyl-5-chloropyridazon-6)-4-yl carbamate
ethyl N-(1-phenyl-5-bromopyridazon-6)-4-yl carbamate
phenyl N-(1-phenyl-5-chloropyridazon-6)-4-yl carbamate
phenyl N-(1-phenyl-5-bromopyridazon-6)-4-yl carbamate
p-hydroxyphenyl N-(1-phenyl-5-chloropyridazon-6)-4-yl carbamate
p-hydroxyphenyl N-(1-phenyl-5-bromopyridazon-6)-4-yl carbamate
phenylthiol N-(1-phenyl-5-chloropyridazon-6)-4-yl carbamate
phenylthiol N-(1-phenyl-5-bromopyridazon-6)-4-yl carbamate pentachlorophenyl N-(1-phenyl-5-chloropyridazon-6)-4-yl carbamate
pentachlorophenyl N-(1-phenyl-5-bromopyridazon-6)-4-yl carbamate
β-hydroxyethyl N-(1-phenyl-5-bromopyridazon-6)-4-yl carbamate
tribromophenyl N-(1-phenyl-5-bromopyridazon-6)-4-yl carbamate
β-chloroethyl N-(1-phenyl-5-chloropyridazon-6)-4-yl carbamate
thiocyanoethyl N-(1-phenyl-5-chloropyridazon-6)-4-yl carbamate
isopropylphenyl N-(1-phenyl-5-chloropyridazon-6)-4-yl carbamate
ethyl N-(1-cyclohexyl-5-chloropyridazon-6)-4-yl carbamate
ethyl N-(1-cyclohexyl-5-bromopyridazon-6)-4-yl carbamate
phenyl N-(1-cyclohexyl-5-chloropyridazon-6)-4-yl carbamate
phenyl N-(1-cyclohexyl-5-bromopyridazon-6)-4-yl carbamate
p-hydroxyphenyl N-(1-cyclohexyl-5-chloropyridazon-6)-4-yl carbamate
p-hydroxyphenyl N-(1-cyclohexyl-5-bromopyridazon-6)-4-yl carbamate
phenylthiol N-(1-cyclohexyl-5-chloropyridazon-6)-4-yl carbamate
phenylthiol N-(1-cyclohexyl-5-bromopyridazon-6)-4-yl carbamate
pentachlorophenyl N-(1-cyclohexyl-5-chloropyridazon-6)-4-yl carbamate
pentachlorophenyl N-(1-cyclohexyl-5-bromopyridazon-6)-4-yl carbamate
β-hydroxyethyl N-(1-cyclohexyl-5-bromopyridazon-6)-4-yl carbamate
tribromophenyl N-(1-cyclohexyl-5-bromopyridazon-6)-4-yl carbamate
β-chloroethyl N-(1-cyclohexyl-5-chloropyridazon-6)-4-yl carbamate
thiocyanomethyl N-(1-cyclohexyl-5-chloropyridazon-6)-4-yl carbamate
isopropylphenyl N-(1-cyclohexyl-5-chloropyridazon-6)-4-yl carbamate
ethyl N-(1-cyclooctyl-5-chloropyridazon-6)-4-yl carbamate
ethyl N-(1-cyclooctyl-5-bromopyridazon-6)-4-yl carbamate
phenyl N-(1-cyclooctyl-5-chloropyridazon-6)-4-yl carbamate
phenyl N-(1-cyclooctyl-5-bromopyridazon-6)-4-yl carbamate
p-hydroxyphenyl N-(1-cyclooctyl-5-chloropyridazon-6)-4-yl carbamate
p-hydroxyphenyl N-(1-cyclooctyl-5-bromopyridazon-6)-4-yl carbamate
phenylthiol N-(1-cyclooctyl-5-chloropyridazon-6)-4-yl carbamate
phenylthiol N-(1-cyclooctyl-5-bromopyridazon-6)-4-yl carbamate
pentachlorophenyl N-(1-cyclooctyl-5-chloropyridazon-6)-4-yl carbamate
pentachlorophenyl N-(1-cyclooctyl-5-bromopyridazon-6)-4-yl carbamate
tribromophenyl N-(1-cyclooctyl-5-bromopyridazon 6)-4-yl carbamate
β-chloroethyl N-(1-cyclooctyl-5-chloropyridazon-6)-4-yl carbamate
thiocyanomethyl N-(1-cyclooctyl-5-chloropyridazon-6)-4-yl carbamate
isopropylphenyl N-(1-cyclooctyl-5-chloropyridazon-6)-4-yl carbamate
ethyl N-(1-cyclohexenyl-5-chloropyridazon-6)-4-yl carbamate
ethyl N-(1-cyclohexenyl-5-bromopyridazon-6)-4-yl carbamate
phenyl N-(1-cyclohexenyl-5-chloropyridazon-6)-4-yl carbamate
phenyl N-(1-cyclohexenyl-5-bromopyridazon-6)-4-yl carbamate
p-hydroxyphenyl N-(1-cyclohexenyl-5-chloropyridazon-6)-4-yl carbamate
p-hydroxyphenyl N-(1-cyclohexenyl-5-bromopyridazon-6)-4-yl carbamate
phenylthiol N-(1-cyclohexenyl-5-chloropyridazon-6)-4-yl carbamate
phenylthiol N-(1-cyclohexenyl-5-bromopyridazon-6)-4-yl carbamate
pentachlorophenyl N-(1-cyclohexenyl-5-chloropyridazon-6)-4-yl carbamate
pentachlorophenyl N-(1-cyclohexenyl-5-bromopyridazon-6)-4-yl carbamate
tribromophenyl N-(1-cyclohexenyl-5-bromopyridazon-6)-4-yl carbamate
β-chloroethyl N-(1-cyclohexenyl-5-chloropyridazon-6)-4-yl carbamate
thiocyanomethyl N-(1-cyclohexenyl-5-chloropyridazon-6)-4-yl-carbamate
isopropylphenyl N-(1-cyclohexenyl-5-chloropyridazon-6)-4-yl carbamate

EXAMPLE 6

The plants beet (*Beta vulgaris*), Indian corn (*Zea mays*), white goosefoot (*Chenopodium album*), amaranth pigweed (*Amaranthus retroflexus*), chickweed (*Stellaria media*), small nettle (*Urtica urens*), camomile (*Matricaria chamomilla*), wild mustard (*Sinapis arvensis*) and annual meadow grass (*Poa annua*) are treated at a growth height of 4 to 16 cm. with III and, for comparison, with A. The rate of application is 2 kg. of active ingredient per hectare dispersed in an amount of water equivalent to 500 liters per hectare. Three weeks later it is evident that III has a better herbicidal action than A.

| | Active ingredient | |
| --- | --- | --- |
| | III | A |
| Crop plants: | | |
| Beet | 0 | 0. |
| Indian corn | 0 | 0 to 10. |
| Unwanted plants: | | |
| White goosefoot | 100 | 80. |
| Amaranth pigweed | 100 | 70 to 80. |
| Chickweed | 100 | 80 to 90. |
| Small nettle | 90 to 100 | 80. |
| Camomile | do | 70 to 80. |
| Wild mustard | 100 | 90. |
| Annual meadow grass | 90 to 100 | 70 to 80. |

0=no damage; 100=total destruction.

EXAMPLE 7

An agricultural cultivated area is sown with wild mustard (*Sinapis arvensis*), white goosefoot (*Chenopodium album*), small nettle (*Urtica urens*), chickweed (*Stellaria media*), gallant soldier (*Galinsoga parviflora*), camomile (*Matricaria chamomilla*) and annual meadow grass (*Poa annua*) and treated on the day of sowing with III and, for comparison, with B. The rate of application is 5 kg. per hectare of active ingredient in an amount of water equivalent to 500 liters per hectare. After the broadleafed and grass weeds have emerged it is evident that III has a stronger initial herbicidal action than B. Almost all the plants are completely dead after four weeks.

EXAMPLE 8

An agricultural cultivated area which is overgrown with wild mustard (*Sinapis arvensis*), white goosefoot (*Chenopodium album*), small nettle (*Urtica urens*), camomile (*Matricaria chamomilla*), chickweed (*Stellaria media*), gallant soldier (*Galinsoga parviflora*) and annual meadow grass (*Poa annua*) is treated at a growth height of the plants of 3 to 7 cm. with III and, for comparison, with B. The rate of application is 3 kg. per hectare of active ingredient dispersed in an amount of water equivalent to 500 liters per hectare. Some days later it is evident that active ingredient III has a stronger initial herbicidal action than active ingredient B. Three weeks later almost all the plants are completely dead.

We claim:
1. A pyridazone derivative of the formula

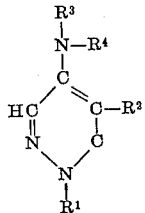

in which $R^1$ is a member selected from the group consisting of phenyl, fluoro-substituted phenyl, chloro-substituted phenyl, lower alkyl-substituted phenyl, cyclohexyl, cyclooctyl and cyclohexenyl, $R^2$ is a member selected from the group consisting of chlorine, bromine, methoxyl and thiomethyl, $R^3$ and $R^4$ together form =C=O or =S=O, or $R^3$ is a member selected from the group consisting of hydrogen and alkyl of one to four carbon atoms and $R^4$ denotes —$COXR^5$ in which X denotes =O or =S and $R^5$ is a member selected from the group consisting of

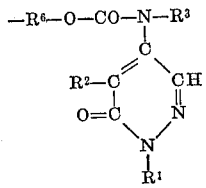

in which $R^6$ denotes ethylene, propylene or butylene and $R^1$, $R^2$ and $R^3$ have the above meanings, alkyl of one to eighteen carbon atoms, a hydroxyl-substituted alkyl of 1 to 18 carbon atoms, methoxyl-substituted alkyl of 1 to 18 carbon atoms, ethoxyl-substituted alkyl of 1 to 18 carbon atoms, carboxyl-substituted alkyl of 1 to 18 carbon atoms, chloro-substituted alkyl of 1 to 18 carbon atoms, bromo-substituted alkyl of 1 to 18 carbon atoms, thiocyano-substituted alkyl of 1 to 18 carbon atoms, dialkylamino-substituted alkyl of 1 to 18 carbon atoms, each of said alkyls containing 1 to 4 carbon atoms, alkenyl of three or four carbon atoms, chloro-substituted alkenyl of 3 to 4 carbon atoms, alkinyl of three to six carbon atoms, phenyl chloro-substituted phenyl, bromo-substituted phenyl, hydroxyl-substituted phenyl, lower alkyl-substituted phenyl, cyclohexyl, cyclooctyl and benzyl radical.

2. 1-phenyl-4-sulfinylamino-5-chloropyridazone-6.
3. 1-phenyl-4-isocyanato-5-bromopyridazone-6.
4. β-hydroxyethyl N-(1-phenyl-5-chloropyridazone-6)-4-yl carbamate.
5. A method of controlling unwanted plants wherein the plants or the soil in which the plants are growing or are to grow are treated with a phytotoxis quantity of the pyridazone derivative as claimed in claim 1.

No references cited.

NICHOLAS S. RIZZO, *Primary Examiner.*

UNITED STATES PATENT OFFICE
CERTIFICATE OF CORRECTION

Patent No. 3,341,317                                September 12, 1967

Franz Reicheneder et al.

It is hereby certified that error appears in the above numbered patent requiring correction and that the said Letters Patent should read as corrected below.

Columns 5 and 6, in the table, last column, last line, for "194 to 199" read -- 194 to 195 --; column 8, line 9, for "disprsed" read -- dispersed --; line 37, for "chloropridazon" read -- chloropyridazon --; column 11, lines 8 to 17, for that portion of the formula reading

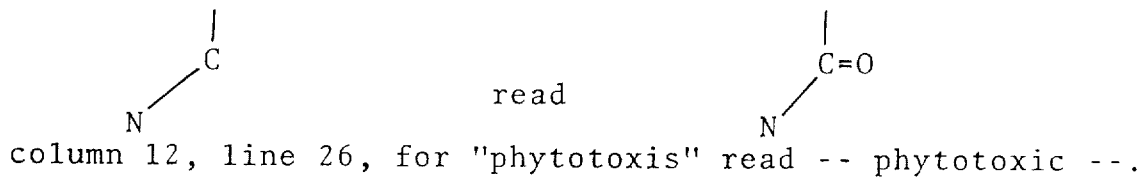

column 12, line 26, for "phytotoxis" read -- phytotoxic --.

Signed and sealed this 22nd day of April 1969.

(SEAL)
Attest:

EDWARD M. FLETCHER, JR.                      EDWARD J. BRENNER
Attesting Officer                               Commissioner of Patents